US012688168B1

(12) United States Patent
Kaul et al.

(10) Patent No.: US 12,688,168 B1
(45) Date of Patent: Jul. 21, 2026

(54) SCHEMA RECOMMENDATIONS

(71) Applicant: INTERNATIONAL BUSINESS MACHINES CORPORATION, Armonk, NY (US)

(72) Inventors: Akshar Kaul, Bangalore (IN); Hima Patel, Bengaluru (IN); Shazia Afzal, New Delhi (IN); Sameep Mehta, Bangalore (IN); Vaibhav Sudhakar Dantale, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/035,592

(22) Filed: Jan. 23, 2025

(51) Int. Cl.
*G06F 16/21* (2019.01)
*G06F 16/2457* (2019.01)
*G06F 16/248* (2019.01)

(52) U.S. Cl.
CPC ...... *G06F 16/213* (2019.01); *G06F 16/24578* (2019.01); *G06F 16/248* (2019.01)

(58) Field of Classification Search
CPC . G06F 16/213; G06F 16/24578; G06F 16/248
See application file for complete search history.

(56) References Cited

U.S. PATENT DOCUMENTS

| | | | | |
|---|---|---|---|---|
| 6,473,851 | B1 * | 10/2002 | Plutowski | .............. G06N 20/00 706/5 |
| 7,996,413 | B2 | 8/2011 | Cotichini et al. | |

| | | | | |
|---|---|---|---|---|
| 8,195,621 | B2 * | 6/2012 | Elisha | ................... G06F 16/211 707/626 |
| 8,458,167 | B2 * | 6/2013 | Lohman | ................. G06Q 10/06 707/715 |
| 9,223,819 | B2 | 12/2015 | Cotichini et al. | |
| 9,934,266 | B2 * | 4/2018 | Wright | ................ G06F 16/2379 |
| 10,162,610 | B2 | 12/2018 | Apte et al. | |
| 10,324,695 | B2 | 6/2019 | Champagne | |
| 10,606,573 | B2 | 3/2020 | Apte et al. | |
| 10,929,348 | B2 * | 2/2021 | Bates-Haus | ........... G06F 16/215 |
| 11,099,823 | B2 | 8/2021 | Gass et al. | |
| 11,151,125 | B1 * | 10/2021 | Dwivedi | ............. G06F 11/3409 |

(Continued)

FOREIGN PATENT DOCUMENTS

WO        2024/049796 A1        3/2024

OTHER PUBLICATIONS

Etien et al., "Automatic Recommendations for Evolving Relational Databases Schema", Apr. 12, 2024, 23 pages.

(Continued)

*Primary Examiner* — Jorge A Casanova
(74) *Attorney, Agent, or Firm* — Seed Intellectual Property Law Group LLP

(57)        ABSTRACT

Embodiments analyze at least one data source from at least one database to extract characteristics for the at least one data source; generate at least one recommendation based on the extracted characteristics for the at least one data source; perform conflict resolution on the generated at least one recommendation by removing at least one conflicted recommendation in the at least one recommendation; determine a chosen recommendation (CR) set based on the conflict resolution; rank each recommendation in the CR set based on a ranking score; and display a visual summary of each recommendation in the CR set.

20 Claims, 7 Drawing Sheets

(56) References Cited

U.S. PATENT DOCUMENTS

| | | | | |
|---|---|---|---|---|
| 11,182,360 | B2 * | 11/2021 | Das | G06F 16/2282 |
| 11,263,268 | B1 * | 3/2022 | Bourbie | G06F 16/2228 |
| 11,360,951 | B1 | 6/2022 | Gilderman et al. | |
| 11,573,971 | B1 * | 2/2023 | Cannon | G06F 16/252 |
| 11,574,242 | B1 * | 2/2023 | Burke | G06F 16/2477 |
| 11,615,061 | B1 * | 3/2023 | Malik | G06F 16/214 |
| | | | | 707/602 |
| 11,762,869 | B1 * | 9/2023 | Werner | H04L 45/02 |
| | | | | 707/722 |
| 11,921,707 | B2 * | 3/2024 | Agarwal | G06F 16/2282 |
| 12,013,824 | B1 * | 6/2024 | Reeves | G06F 11/302 |
| 12,169,499 | B1 * | 12/2024 | Cannon | G06F 16/904 |
| 12,321,343 | B1 * | 6/2025 | Mehta | G06F 16/243 |
| 12,423,311 | B1 * | 9/2025 | Stoll | G06F 16/24578 |
| 2009/0164491 | A1 | 6/2009 | Cotichini et al. | |
| 2010/0057759 | A1 | 3/2010 | Cotichini et al. | |
| 2010/0250504 | A1 * | 9/2010 | Balasubramanian | |
| | | | | G06F 16/217 |
| | | | | 707/696 |
| 2013/0110853 | A1 * | 5/2013 | Smith | G06F 16/248 |
| | | | | 707/E17.014 |
| 2015/0019488 | A1 * | 1/2015 | Higginson | G06F 16/214 |
| | | | | 707/634 |
| 2016/0062753 | A1 | 3/2016 | Champagne | |
| 2018/0096000 | A1 * | 4/2018 | Harrison | G06F 16/24578 |
| 2019/0050459 | A1 * | 2/2019 | Griffith | G06F 16/248 |
| 2019/0294719 | A1 * | 9/2019 | Beringer | G06F 16/2465 |
| 2019/0294720 | A1 * | 9/2019 | Beringer | G06F 16/26 |
| 2020/0104401 | A1 * | 4/2020 | Burnett | G06F 16/287 |
| 2020/0104402 | A1 * | 4/2020 | Burnett | G06F 16/288 |
| 2020/0104731 | A1 * | 4/2020 | Oliner | G06F 16/24568 |
| 2020/0174966 | A1 | 6/2020 | Szczepanik et al. | |
| 2023/0018975 | A1 | 1/2023 | Sreenivasan et al. | |
| 2023/0060252 | A1 * | 3/2023 | Bly | G06F 16/9024 |
| 2023/0244643 | A1 | 8/2023 | Cheng et al. | |
| 2023/0401038 | A1 | 12/2023 | Rajagopalan et al. | |
| 2024/0126776 | A1 * | 4/2024 | Shmulyan | G06F 16/24578 |
| 2025/0238411 | A1 * | 7/2025 | Padilha | G06F 11/3409 |

OTHER PUBLICATIONS

IBM, "Index advisor", available online at <https://www.ibm.com/docs/en/i/7.4?topic=tools-index-advisor>, Apr. 11, 2023, 2 pages.

Mozaffari et al., "Self-tuning Database Systems: A Systematic Literature Review of Automatic Database Schema Design and Tuning", ACM Comput. Surv., vol. 56, No. 11, Article 277, Jun. 2024, 37 pages.

Oracle, "Manage Automatic Indexing on Autonomous Database", available online at <https://docs.oracle.com/en/cloud/paas/autonomous-database/serverless/adbsb/autonomous-auto-index.html#GUID-D51A4F85-3AE5-4B7D-9B27-32CEDE8DBD79>, retrieved on Mar. 21, 2025, 3 pages.

* cited by examiner

100 ⬐

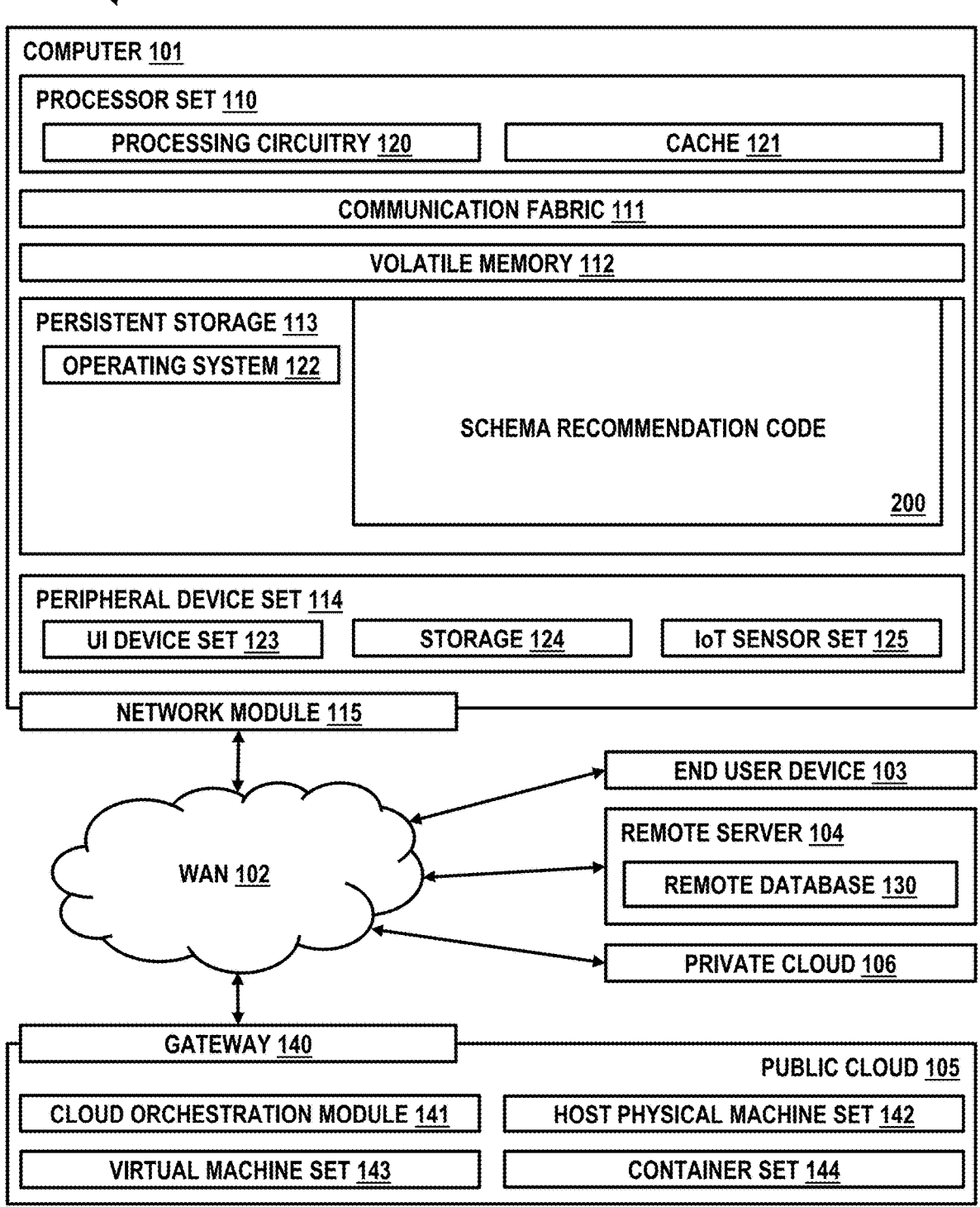

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SCHEMA RECOMMENDATION CODE

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

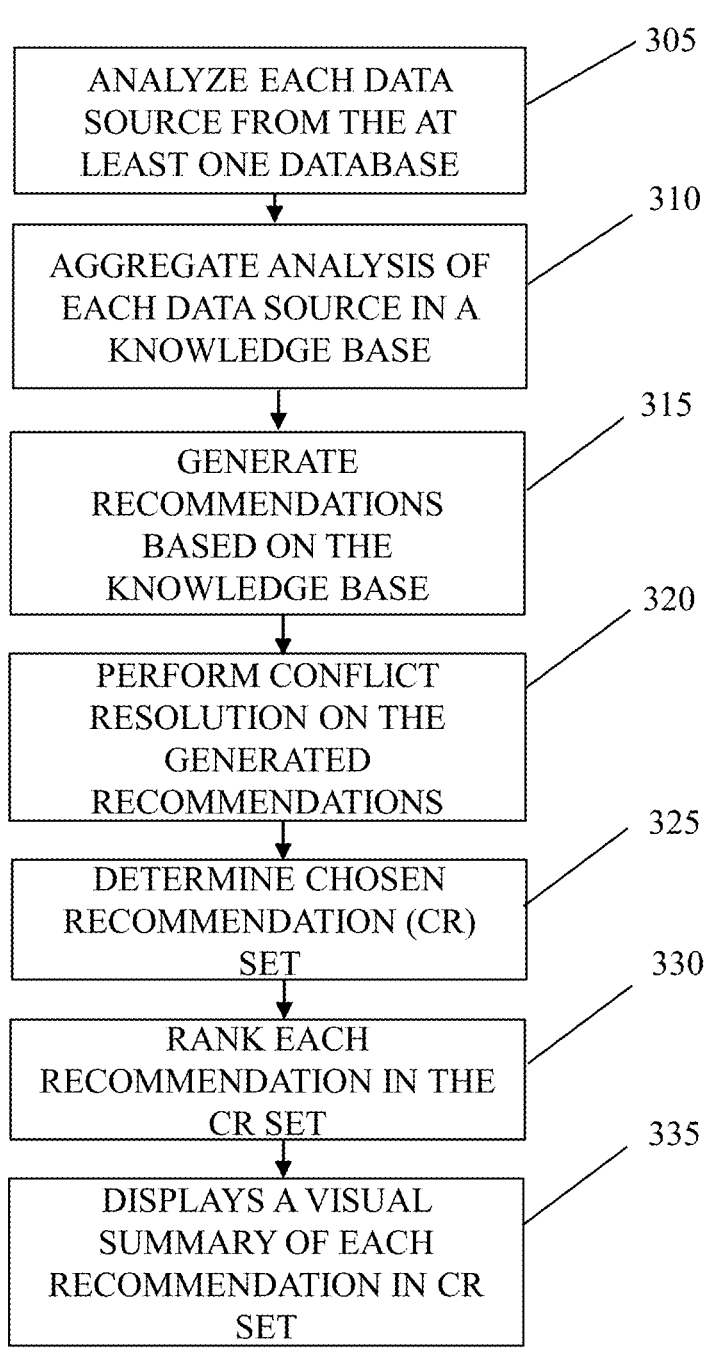

ANALYZE EACH DATA
SOURCE FROM THE AT
LEAST ONE DATABASE — 305

AGGREGATE ANALYSIS OF
EACH DATA SOURCE IN A
KNOWLEDGE BASE — 310

GENERATE
RECOMMENDATIONS
BASED ON THE
KNOWLEDGE BASE — 315

PERFORM CONFLICT
RESOLUTION ON THE
GENERATED
RECOMMENDATIONS — 320

DETERMINE CHOSEN
RECOMMENDATION (CR)
SET — 325

RANK EACH
RECOMMENDATION IN THE
CR SET — 330

DISPLAYS A VISUAL
SUMMARY OF EACH
RECOMMENDATION IN CR
SET — 335

FIG. 4

RECEIVE USER FEEDBACK FOR EACH RECOMMENDATION IN CR SET — 405

UPDATE WEIGHTS ACCORDING TO THE USER FEEDBACK — 410

RECOMPUTE CR SET BASED ON THE UPDATED WEIGHTS AND USER FEEDBACK — 415

DISPLAY EACH RECOMMENDATION IN THE RECOMPUTED CR SET — 420

RECEIVE USER FEEDBACK
FOR EACH
RECOMMENDATION IN THE
CR SET                                    505

GENERATE GENERIC
SCHEMA
RECOMMENDATION BASED
ON USER ACCEPTANCE       510

GENERATE SQL BASED ON
THE GENERIC SCHEMA
RECOMMENDATION            515

UTILIZE THE SQL IN A
TARGET DATABASE ENGINE    520

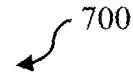
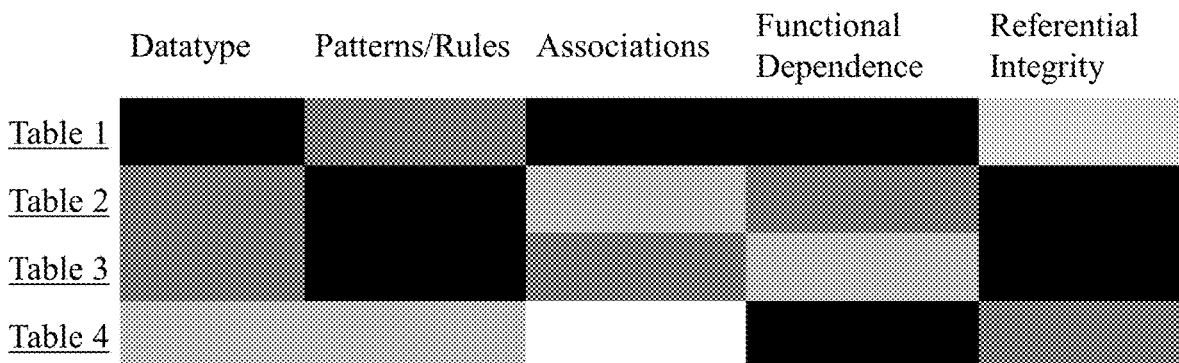
| | Datatype | Patterns/Rules | Associations | Functional Dependence | Referential Integrity |
|---|---|---|---|---|---|
| Table 1 | | | | | |
| Table 2 | | | | | |
| Table 3 | | | | | |
| Table 4 | | | | | |
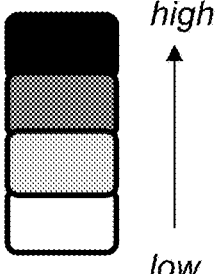
FIG. 7

SCHEMA RECOMMENDATIONS

BACKGROUND

Aspects of the present invention relate generally to a system and a method for generating database schema recommendations.

Database modernization may involve converting legacy databases to cloud databases. In addition, database modernization may also involve changing a database engine and upgrading a database schema. The database scheme comprises a blueprint that defines the structure, organization, and relationships of data within a database.

SUMMARY

In a first aspect of the invention, there is a computer-implemented method including: analyzing, by a processor set, at least one data source from at least one database to extract characteristics for the at least one data source; generating, by the processor set, at least one recommendation based on the extracted characteristics form the at least one data source; performing, by the processor set, conflict resolution on the generated at least one recommendation by removing at least one conflicted recommendation in the at least one recommendation; determining, by the processor set, a chosen recommendation (CR) set based on the conflict resolution; ranking, by the processor set, each recommendation in the CR set based on a ranking score; and displaying, by the processor set, a visual summary of each recommendation in the CR set.

In another aspect of the invention, there is a computer program product including one or more computer readable storage media and program instructions stored on the one or more computer readable storage media to perform operations including: analyzing at least one data source from at least one database to extract characteristics for the at least one data source; generating at least one recommendation based on the extracted characteristics form the at least one data source; performing conflict resolution on the generated at least one recommendation by removing at least one conflicted recommendation in the at least one recommendation; determining a chosen recommendation (CR) set based on the conflict resolution; ranking each recommendation in the CR set based on a ranking score; and displaying a visual summary of each recommendation in the CR set.

In another aspect of the invention, there is a system including a processor set, one or more computer readable storage media, and program instructions stored on the one or more computer readable storage media to cause the processor set to perform operations including: analyzing at least one data source from at least one database to extract characteristics for the at least one data source; generating at least one recommendation based on the extracted characteristics form the at least one data source; performing conflict resolution on the generated at least one recommendation by removing at least one conflicted recommendation in the at least one recommendation; determining a chosen recommendation (CR) set based on the conflict resolution; ranking each recommendation in the CR set based on a ranking score; displaying a visual summary of each recommendation in the CR set; and generating a structured query language (SQL) based on an approval of the displayed visual summary.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 4 shows a flowchart of an exemplary method in accordance with aspects of the present invention.

FIG. 7 shows an example of a visual summary in accordance with aspects of the present invention.

DETAILED DESCRIPTION

Figure 2:
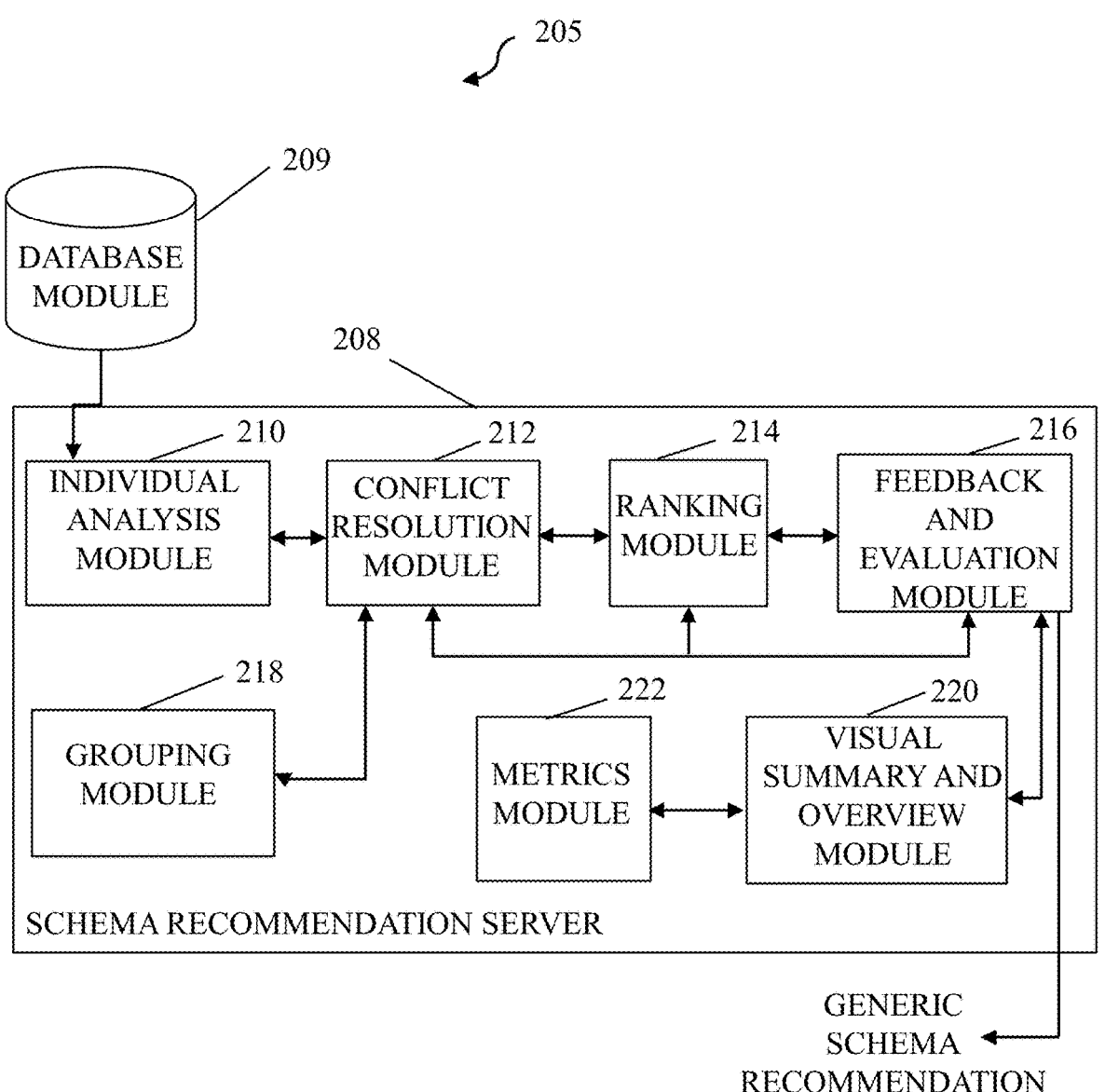
FIG. 2 shows a block diagram of an exemplary environment in accordance with aspects of the present invention.

Aspects of the present invention relate generally to a system and a method for generating database schema recommendations. Embodiments of the present invention provide a system, a computer program product, and a computer-implemented method for automating an analysis of diverse information sources such as a database, application source code, queries, logs, etc. In particular, aspects of the present invention provide a system, a computer program product, and a computer-implemented method to validate schema quality of legacy systems and provide optimized schema recommendations with conflict resolution. In further aspects of the present invention, the computer-implemented method aggregates the information for different applications in a knowledge base. Embodiments of the present invention rank recommendations based on impact and criticality of the recommendations.

Embodiments of the present invention also present the recommendations to a user in an intuitive manner. Embodiments of the present invention receive user feedback in response to presenting the recommendations to the user. Embodiments of the present invention automatically self tune the system based on the user feedback. In particular, embodiments of the present invention generate a structured query language (SQL) code for a target database system based on the recommendations. In aspects of the present invention, the system, the computer program product, and computer-implemented method presents a succinct visual summary of the recommendations and the analysis of the recommendations. Accordingly, implementations of the present invention reduce an overload of information and assist users in reviewing recommendations and providing user feedback in an easy and intuitive manner.

Aspects of the present invention reduce a time for schema improvements. Embodiments of the present invention also decrease an average row length. In addition, further embodiments of the present invention improve data quality for categorical columns. In aspects of the present invention, the system, the computer program product, and the computer-implemented method modernize schema databases to improve overall data capture, storage, and accessibility.

Embodiments of the present invention provide a computer-implemented method, a system, and a computer program product for generating schema recommendations for a database. In contrast, conventional systems typically depend on a manual analysis and are highly dependent on a domain and technology involved. For example, conventional systems sometimes require hundreds of hours for a team to analyze an application and/or database to generate schema recommendations and upgrade the application and/or database accordingly. Lastly, conventional systems require a large amount of institutional knowledge from employees who originally designed the system, but are no longer with a company, to provide schema recommendations for upgrades. Accordingly, conventional systems have limitations which prevent schema upgrades and end to end visibility.

Embodiments of the present invention include a system, method, and computer program product for providing an automated system for analyzing diverse information sources, validating legacy systems, and providing optimized schema recommendations. Accordingly, implementations of the present invention provide an improvement (i.e., technical solution) to a problem arising in the technical field of schema upgrades for legacy applications and databases. In particular, embodiments of the present invention generate schema recommendations for a user, receive user feedback, and self tune based on the user feedback. Further, embodiments of the present invention generate a SQL code for a target database system based on the self tuned recommendations.

Implementations of the present invention are necessarily rooted in computer technology. For example, the steps of generating recommendations based on at least one data source; performing conflict resolution on the generated recommendations by removing at least one conflicted recommendation; ranking each of the generated recommendations; and displaying a visual summary of the generated recommendations cannot be performed in the human mind (or with pen and paper). Generating recommendations, performing conflict resolution on the generated recommendations, ranking the generated recommendations, and displaying the visual summary of the generated recommendation in real-time is, by definition, performed by a computer and cannot be performed in the human mind (or with a pen and paper) due to the complexity and amounts of calculations involved in the automated real-time recommendations system. In further embodiments, the steps of receiving user feedback for each recommendation; re-computing the recommendations based on the user feedback; and generating a SQL code for a target database system in real-time based on the re-computed recommendations are also rooted in computer technology and cannot be performed in the human mind (or with pen and paper).

Aspects of the present invention include a method, system, and computer program product for enhancing a data modernization process by validating a schema quality of legacy systems and generating optimized schema recommendations from diverse information resources. For example, a computer-implemented method includes: generating recommendations by combining analysis from diverse information sources including existing schema, data, logs, policy documents, domain knowledge, and queries and performing conflict resolution; performing ranking of generated recommendations by utilizing a weighted system; performing evaluation and feedback of the ranked recommendations and providing a synthesized visual overview of results to highlight key recommendations based on an impact of the key recommendations; and generating SQL code based on the key recommendations by creating data definition languages (DDLs) aligned to a target schema syntax. In further embodiments, the computer-implemented method provides the synthesized visual overview which reduces information overload and help users navigate through the results and customizes the impact of the key recommendations through metrics such as data validity, storage efficiency, performance, etc.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as schema recommendation code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment 205 includes a schema recommendation server 208, which may comprise one or more instances of the computer 101 of FIG. 1. In other examples, the schema recommendation server 208 comprises one or more virtual machines or one or more containers running on one or more instances of the computer 101 of FIG. 1. The environment 205 may also include a database module 209 which is external to the schema recommendation server 208 and may be included in at least one external server, such as one or more instances of the remote server 104 of FIG. 1.

In embodiments, the schema recommendation server 208 of FIG. 2 comprises an individual analysis module 210, a conflict resolution module 212, a ranking module 214, a feedback and evaluation module 216, a grouping module 218, a visual summary and overview module 220, and a metrics module 222 each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The schema recommendation server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the individual analysis module 210 collects various data sources from the database module 209. In further embodiments, the database module 209 includes at least one database and may further include multiple databases, such as one or more instances of the remote database 130 of FIG. 1. In aspects of the present invention, the various data sources comprise at least one of database data, query data, log data, domain knowledge data, policy document data, and application source code data. In an example of database data, the individual analysis module 210 collects the database data and utilizes a database catalog to extract current schema information for the database data. In further embodiments, the individual analysis module 210 extracts the current schema information including table names, column names, column data types, referential integrity, and unique constraints, check constraints, etc., from the database data. In further embodiments, the individual analysis module 210 also extracts database indexes, a type of the database indexes, stored procedures, triggers, etc. The individual analysis module 210 analyzes the database data in each column to derive data characteristics, such as a type of data, range of data, a pattern, etc. In further aspects of the present invention, the individual analysis module 210 maps columns of the database data to domain keywords by utilizing column names and column data of the database data. For example, the individual analysis module 210 maps a credit card number column, a CC Num column, and a card num column to a domain keyword of a "credit card number" being stored in these columns.

In embodiments, in an example of query data, the individual analysis module 210 parses the query data to extract information about the columns. For example, the individual analysis module 210 determines that columns are being joined together and extracts the join condition statement. In further embodiments, the individual analysis module 210 is configured to determine that columns are used in predicates and extract a constraint value. For example, the individual analysis module 210 may determine that for email, the constraint value would be *@email.com. The individual analysis module 210 also extracts insert and update queries from the query data, such as the columns where data is being inserted and/or updated.

In further embodiments, in an example of log data, the individual analysis module 210 extracts queries issued, frequency of queries, query templates which are called by an application, and transaction information from the log data. In aspects of the present invention, the log data comprises database log data and application log data. In further aspects of the present invention, the transaction information can include multiple queries such as a select query and an insert query which are executed as a single unit.

In aspects of the present invention, in an example of domain knowledge data, the individual analysis module 210 extracts domain keywords, sample values for the domain keywords, and a description of a value which the domain keyword can contain. For example, the description of the value can be "account balance >0", "age between 0 to 150", and "amount=price*quantity". In embodiments, the domain knowledge data can be provided by a subject matter expert (SME) or an existing ontology.

In embodiments of the present invention, in an example of policy document data, the individual analysis module 210 extracts policies that are enforced by an application. In particular, the individual analysis module 210 utilizes natural language processing (NLP) techniques on the policy document data to determine domain keywords, sample values for the domain keywords, and the description of the value which the domain keyword can contain. Similar to the example of domain knowledge data, the description of the value for the policy document data can be "account balance >0", "age between 0 to 150", and "amount=price*quantity".

In aspects of the present invention, in an example of application source code data, the individual analysis module 210 scans the application source code data to extract query templates, transactions, and business rules. In embodiments, the individual analysis module 210 outputs characteristics (e.g., current schema information, information about the columns, queries issued, domain keywords, policies that are enforced by an application, etc.) of the various data sources to the conflict resolution module 212.

In particular, the conflict resolution module 212 receives the characteristics of the various data sources from the individual analysis module 210 and grouping characteristics from the grouping module 218. In further embodiments, the grouping module 218 creates grouping characteristics including type based grouping of databases, inter database grouping (e.g., communication or data exchange between separate databases) of databases, and intra database grouping (e.g., operations or interactions within a single database) of databases. The grouping module 218 sends the grouping characteristics to the conflict resolution module 212. However, embodiments are not limited to the above examples, and the grouping module 218 may include additional groupings of the databases.

In accordance with aspects of the present invention, the conflict resolution module 212 receives the characteristics of the various data sources from the individual analysis module 210 and stores the characteristics of the various data sources in a knowledge base. In further embodiments, the knowledge base is included in the conflict resolution module 212. The conflict resolution module 212 converts the characteristics of the various data sources into a standard format so that the standardized characteristics can be stored in the knowledge base and utilized further in a pipeline. The conversion of the characteristics of the various data sources into the standardized characteristics allows for a plug-in based approach. For example, a sample standard format may include database information "db info [ ]" which includes scheme, table name, and column name, domain information "domain info [ ]" which includes "keyword [ ]", analysis which includes an analysis type, an analysis value, a source of the analysis, and metadata. In further embodiments, the metadata is utilized further in the pipeline for storing data such as weights assigned, user feedback on recommendations derived from the analysis, etc. In further aspects of the present invention, the knowledge base stores the analysis for different applications intra enterprise (e.g., different applications within the enterprise) and inter enterprise (e.g., different applications between different enterprises). In further embodiments, the analysis for the inter enterprise may be stored and hosted by a third party enterprise. The conflict resolution module 212 sends the standardized characteristics to the feedback and evaluation module 216.

In aspects of the present invention, the conflict resolution module 212 uses the standardized characteristics stored in the knowledge base to generate recommendations. In additional embodiments, the conflict resolution module 212 can also use information from other databases to generate the recommendations. The conflict resolution module 212 generates different and/or conflicting recommendations based on the different data sources. In particular, the conflict resolution module 212 performs conflict resolution in response to generating different and/or conflicting recommendations. In further embodiments, the conflict resolution module 212 assigns weights to the different data sources. In further aspects of the present invention, the conflict resolution module 212 can assign different weights for different domains. In embodiments of the present invention, the conflict resolution module 212 can also assign different weights for different databases. In this situation, the conflict resolution module 212 can utilize the different weights for different databases to influence a recommendation of another database.

In embodiments of the present invention, the conflict resolution module 212 performs a first step for generating the recommendations. In particular, the conflict resolution module 212 generates "group 1 recommendations" according to database information "DB Info". In further embodiments, the conflict resolution module 212 generates "group 2 recommendations" according to domain keywords. In aspects of the present invention, the conflict resolution module 212 generates "group 3 recommendations" according to domain keywords across databases. The conflict resolution module 212 defines an all recommendations (AR) set as initially being an empty set (e.g., AR set initially has no recommendations). In further embodiments of the first step for generating the recommendations, the conflict resolution module 212 iterates over current columns of a source database: "cur_column". In particular, the conflict resolution module 212 iterates over recommendations from "group 1 recommendations" which belong to "current column 'cur_column': current record 'cur_reco'". In embodiments the current column "cur_column" represents a key of the database and the current record "cur_reco" represents a value associated with the key. In this situation of the recommendations from "group 1 recommendations" belonging to "cur_column: cur_reco", the conflict resolution module 212 updates a weight of the current record "cur_reco" in response to the current record "cur_reco" existing in the AR set. In a situation in which the recommendations from "group 1 recommendations" does not belong to "cur_column: cur_reco", the conflict resolution adds the current record "cur_reco" to the AR set.

In further embodiments of the first step for generating the recommendations, the conflict resolution module 212 iterates over recommendations from "group 2 recommendations" which belong to a domain keyword of the "current column 'cur_column': current record 'cur_reco'". In this situation of the recommendations from "group 2 recommendations" belonging to the domain keyword of the "cur_column: cur_reco", the conflict resolution module 212 updates the weight of the current record "cur_reco" in response to the current record "cur_reco" existing in the AR set. In a situation in which the recommendations from "group 2 recommendations" does not belong to the domain keyword of the "cur_column: cur_reco", the conflict resolution adds the current record "cur_reco" to the AR set.

In further embodiments of the first step for generating the recommendations, the conflict resolution module 212 iterates over recommendations from "group 3 recommendations" which belong to the domain keyword of the "current column 'cur_column': current record 'cur_reco'". In this situation of the recommendations from "group 3 recommendations" belonging to the domain keyword of the "cur_column: cur_reco", the conflict resolution module 212 updates the weight of the current record "cur_reco" in response to the current record "cur_reco" existing in the AR set. In a situation in which the recommendations grom "group 3 recommendations" does not belong to the domain keyword of the "cur_column: cur_reco", the conflict resolution adds the current record "cur_reco" to the AR set.

In aspects of the present invention, the conflict resolution module 212 performs a second step for generating the recommendations. In a first option for the second step, the conflict resolution module 212 performs a greedy approach algorithm. In the greedy approach algorithm, the conflict resolution module 212 defines a chosen recommendation (CR) set as initially being an empty set (e.g., CR set initially has no recommendations). In further embodiments of the greedy approach algorithm, the conflict resolution module 212 iterates over recommendations from the AR set (e.g., cur_reco) in step 1 in a descended weighted matter such that "cur_reco" is added to the CR set in response to the "curo_rec" not having a conflict with any recommendation from the AR set. In the first option for the second step, the conflict resolution module 212 sends the CR set to the ranking module 214 and the feedback and evaluation module 216.

In further aspects of the present invention, in a second option for the second step, the conflict resolution module 212 performs an optimized approach algorithm. In the optimized approach algorithm, the conflict resolution module 212 defines the chosen recommendation (CR) set as initially being the empty set (e.g., CR set initially has no recommendations). In further embodiments of the optimized approach algorithm, the conflict resolution module 212 picks the CR set as a subset of the AR set such that for any two recommendations (e.g., x recommendation and y recommendation) belonging to the CR set, the conflict resolution module 212 verifies that the x and y recommendations do not conflict with each other and that the CR set has a maximum weight amongst all of the subsets of the AR set. In the second option for the second step, the conflict resolution module 212 sends the CR set to the ranking module 214 and the feedback and evaluation module 216. In further embodiments, the conflict resolution module 212 can be set to performing the first option or the second option by an administrator or a user of the schema recommendation server 208.

In embodiments of the present invention, the ranking module 214 determines the effect of each recommendation in the CR set. In further embodiments, the ranking module 214 determines the effect on storage, the effect on query performance, the effect on validity, the effect on data quality for each recommendation in the CR set. In aspects of the present invention, the ranking module 214 also ensures that mandatory recommendations (e.g., a data type change) should be ranked high in comparison to the determined effects of remaining recommendations by the ranking module 214. In further embodiments, the ranking module 214 generates a ranking score for each recommendation in the CR set based on the determined effects. In aspects of the present invention, the ranking module 214 sends the ranking score for each recommendation in the CR set to the feedback and evaluation module 216.

In aspects of the present invention, the feedback and evaluation module 216 receives the ranking score for each recommendation in the CR set from the ranking module 214 and the CR set and the standardized characteristics from the conflict resolution module 212, and sends the ranking score for each recommendation in the CR set, the standardized characteristics, and the CR set to the visual summary and overview module 220.

In further embodiments, the visual summary and overview module 220 receives the ranking score for each recommendation in the CR set from the ranking module 214 and the CR set from the conflict resolution module 212 and provides (e.g., displays) a visual summary of the recommendations in the CR set. In aspects of the present invention, the visual summary and overview module 220 provides the visual summary of the recommendations in the CR set by showing the ranked recommendations of the CR set in descending order based on the ranking score (e.g., the ranked recommendation of the CR set with a highest ranking score is shown first). In embodiments of the present invention, the visual summary and overview module 220 provides the visual summary of the recommendations in the CR set by grouping the recommendations in the CR set based on a domain. In further embodiments of the present invention, the visual summary and overview module 220 provides the visual summary and overview module 220 provides the visual summary of the recommendations in the CR set by grouping the recommendations in the CR set based on a database (e.g., database db). In aspects of the present invention, the visual summary and overview module 220 provides the visual summary of the recommendations in the CR set to enable a user to navigate through a results space and view prominent and important results in an easy and intuitive manner. Further, implementations of the visual summary and overview module 220 provide the visual summary of the recommendations in the CR set to reduce information overload and help a user review results and take necessary actions for the recommendations in the CR set. In further embodiments, the visual summary and overview module 220 provides the visual summary of the standardized characteristics of the various data sources. The visual summary and overview module 220 receives user feedback from a user regarding the visual summary of the recommendations in the CR set and sends the user feedback to the feedback and evaluation module 216.

In aspects of the present invention, the visual summary and overview module 220 sends a plurality of metrics to the metrics module 222 based on the ranking score for each recommendation in the CR set from the ranking module 214. In other words, the visual summary and overview module 220 determines the plurality of metrics including validity metrics, storage impact metrics, and query performance metrics from the ranking score for each recommendation in the CR set from the ranking module 212 and sends the plurality of metrics including the validity metrics, the storage impact metrics, and the query metrics to the metrics module 222.

In other embodiments, the visual summary and overview module 220 requests the plurality of metrics including the validity metrics, the storage impact metrics, and the query performance metrics from the feedback and evaluation module 216. In this scenario, the feedback and evaluation module 216 then requests the plurality of metrics including the validity metrics, the storage impact metrics, and the query performance metrics from the ranking module 214 and then sends the plurality of metrics including the validity metrics, the storage impact metrics, and the query performance metrics to the visual summary and overview module 220 in response to receiving the plurality of metrics including the validity metrics, the storage impact metrics, and the query performance metrics from the ranking module 214. In further embodiments, the visually summary and overview module then sends the plurality of metrics including the validity metrics, the storage impact metrics, and the query metrics to the metrics module 222.

In further embodiments, the feedback and evaluation module 216 receives the user feedback from the visual summary and overview module 220. In aspects of the present invention, the user feedback comprises one of a user acceptance, a user rejection, or a modification action with regards to the recommendations in the CR set. The feedback and evaluation module 216 updates a weight of each of the recommendations in the CR set in response to the user feedback comprising the modification action. The feedback and evaluation module 216 then recomputes the recommendations in the CR set based on the user feedback and the updated weights of the recommendations in the CR set. The feedback and evaluation module 216 also sends the updated weights to the conflict resolution module 212. In this example, the conflict resolution module 212 assigns the updated weights to the different data sources for performing a next analysis of the different data sources. The feedback and evaluation module 216 also sends the recomputed CR set to the visual summary and overview module 220 so that the visual summary and overview module 220 can present (e.g., display) the recommendations in the recomputed CR set.

In aspects of the present invention in FIG. 2, the feedback and evaluation module 216 sends a generic schema recommendation for the CR set in response to the user feedback comprising the user acceptance. In embodiments, the feedback and evaluation module 216 sends the generic schema recommendation to an external database application which is external to the schema recommendation server 208. In this situation, the external database application generates the SQL for a target database system based on the generic schema recommendation. In further embodiments, the target database system is also external to the schema recommendation server 208. However, embodiments are not limited to this example, and the feedback and evaluation module 216 may generate and store the generic schema recommendation for the CR set within the schema recommendation server 208. In this example, the feedback and evaluation module 216 also generates the SQL for the target database system (which is external to the schema recommendation server 208) and utilizes the SQL in the target database system.

In a first exemplary use case, the individual analysis module 210 collects various data sources from the database module 209. In this example, the various data sources comprise database data, query data, domain knowledge data, and policy document data. In this example, the database data includes an "acct_bal" which is defined as a string with one hundred characters (e.g., string: char(100)). In this example, the query data includes a query of "acct_bal">1000 with the source being a query and the count being 10,000 and another query of "substring (acct_bal,−3)" with the source being an application and the count being 10000. In this example, the domain knowledge data includes the account balance being numeric. In this example, the policy document data includes a policy of "'if branch=metro then account balance >5000' else 'account balance >2000'". In this scenario, the "acct_bal">1000 is ambiguous and the policy document is numeric. In the first exemplary case, the conflict resolution module 212 generates the recommendation of "acct_bal should be numeric".

In a second exemplary use case, the individual analysis module 210 collects various data sources from the database module 209. In this example, the various data sources comprise database data and query data. In this example, the database data includes a first column col1 satisfying inclusion dependency with a second column col2, a third column col3, and a fourth column col4. In this example, the query data includes a first query of "col1=col2" with the source being a query and a count of 10, a second query of "col1=col3" with the source being an application and the count of 10,000, a third query of "other queries of col1" with the count of 30,000, a fourth query of "other queries of col2" with the count of 35,000. a fifth query of "other queries of col3" with the count of 20,000, and a sixth query of "other queries of col4" with the count of 25,000. In this scenario, the "col2", "col4", and "col1=col2" are strings and "col3" and "col1=col3" are numeric. In the second exemplary case, the conflict resolution module 212 generates the recommendation of "referential integrity between col1 and col3".

In a third exemplary use case, the individual analysis module 210 collects various data sources from the database module 209. In this example, the various data sources comprise database data, domain knowledge data, and policy document data. In this example, the database data includes column name: email, metadata: char(100), from data: char (20), and char(50) from another database. In embodiments, the domain knowledge data includes character, the policy document data includes char(50). In this scenario, the char (100) and char(20) are strings and the char(50) is numeric. In the third exemplary case, the conflict resolution module generates the recommendation of "email should be char(50)".

Figure 3:
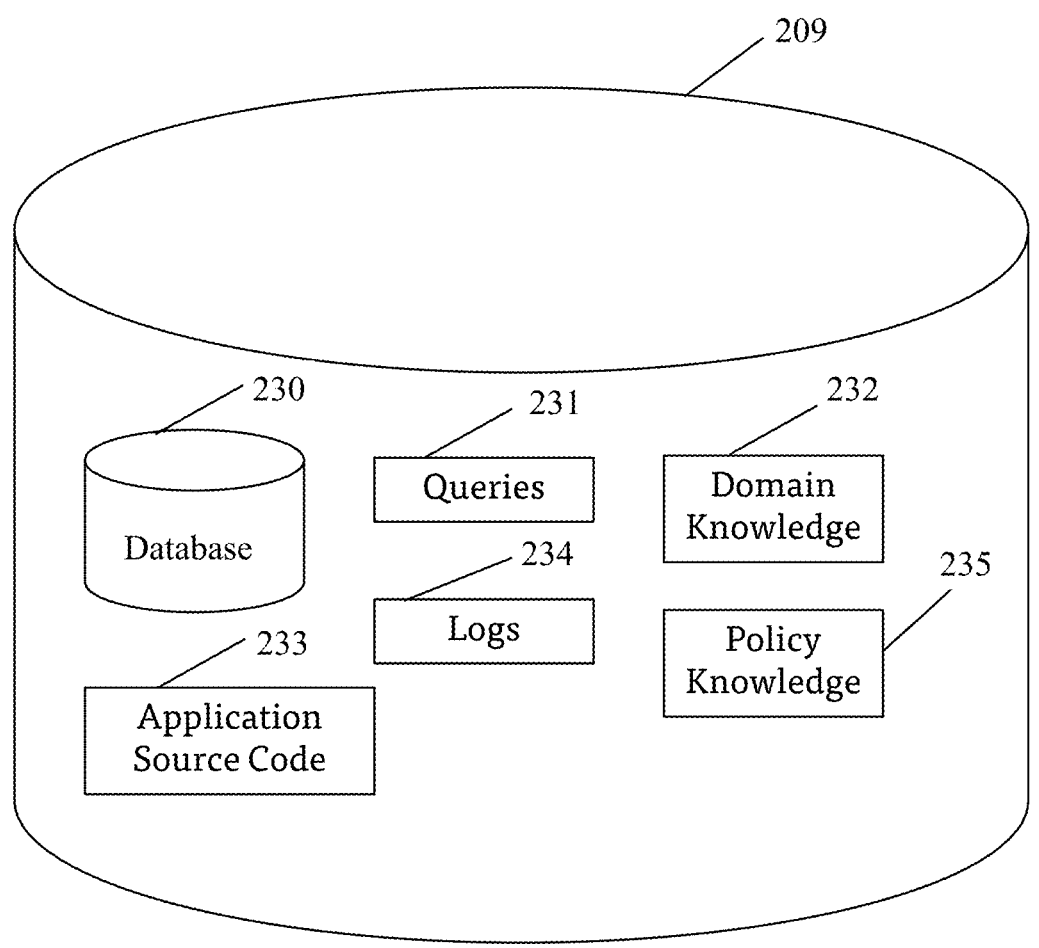
FIG. 3 shows a block diagram of a database module in accordance with aspects of the present invention.

FIG. 3 shows a block diagram of a database module in accordance with aspects of the present invention. In FIG. 3, the database module 209 includes various data sources which comprise at least one database 230, queries 231, domain knowledge 232, application source code 233, logs 234, and policy knowledge 235. In further embodiments, the at least one database 230 of FIG. 3 includes a plurality of databases (e.g., at least three databases).

FIG. 4 shows a flowchart of an exemplary method in accordance with aspects of the present invention. Steps of the method may be carried out as operations in the environment 205 of FIG. 2 and are described with reference to elements depicted in FIG. 2.

At step 305, the system analyzes, at the individual analysis module 210, each data source from the at least one database. In embodiments and as described with FIG. 2, the individual analysis module 210 extracts characteristics of the current schema information from the various data sources. In further embodiments, the various data sources comprise at least one of database data, query data, log data, domain knowledge data, policy document data, and application source code data. At step 310, the system aggregates, at the conflict resolution module 212, the characteristics of the current schema information into a knowledge base.

At step 315, the system generates, at the conflict resolution module 212, recommendations based on the knowledge base. Also, in embodiments and as described with FIG. 2, the conflict resolution module 212 generating the recommendations further comprises assigning weight to the various data sources and utilizing the assigned weights to generate the recommendations.

At step 320, the system performs, at the conflict resolution module 212, conflict resolution on the generated recommendations. In embodiments and as described with FIG. 2, the conflict resolution module 212 performs conflict resolution by removing conflicting recommendations from the generated recommendations. At step 325, the system determines, at the conflict resolution module 212, a chosen recommendation (CR) set based on removing conflicting recommendations performed during the conflict resolution. At step 330, the system ranks, at the ranking module 214, each recommendation of the CR set. In embodiments and as described with FIG. 2, the ranking module 214 generates a ranking score for each recommendation of the CR set based on effects of each recommendation of the CR set on storage, query performance, validity, and data quality. At step 335, the system displays, at the visual summary and overview module 220, a visual summary of the recommendations in the CR set. In embodiments and as described with FIG. 2, the visual summary and overview module 220 displays a visual summary of the recommendations in the CR set in a descending order based on the generated ranking score.

Figure 5:
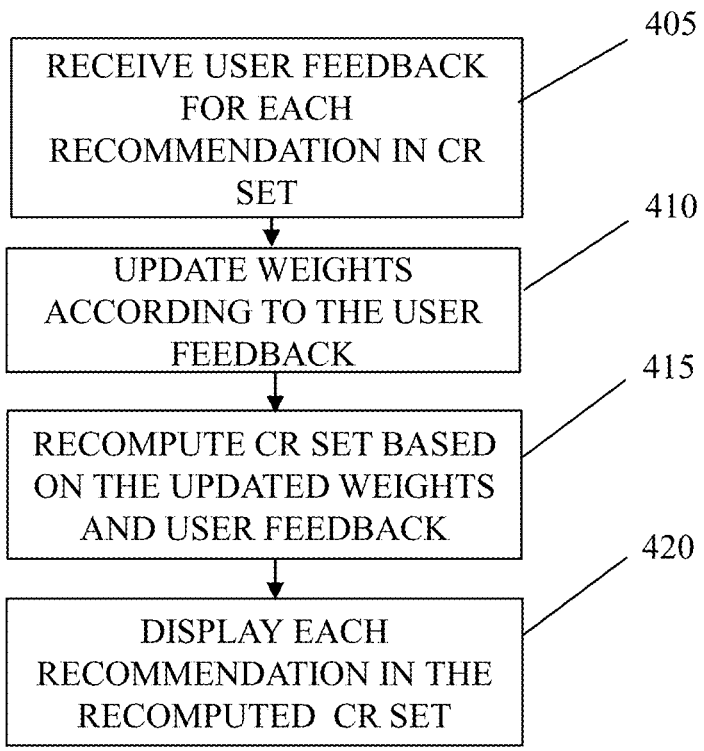
FIG. 5 shows a flowchart of an exemplary method in accordance with aspects of the present invention.

FIG. 5 shows a flowchart of an exemplary method in accordance with aspects of the present invention. Steps of the method may be carried out as operations in the environment 205 of FIG. 2 and are described with reference to elements depicted in FIG. 2.

At step 405, the system receives, at the feedback and evaluation module 216, user feedback. In embodiments and as described with FIG. 2, the user feedback comprises a modification action. At step 410, the system updates, at the feedback and evaluation module 216, a weight of each of the recommendations in the CR set based on the user feedback.

At step 415, the system recomputes, at the feedback and evaluation module 216, the CR set based on the user feedback and the updated weights for each of the recommendations in the CR set. At step 420, the system displays, at the visual summary and overview module 220, each recommendation in the recomputed CR set.

Figure 6:
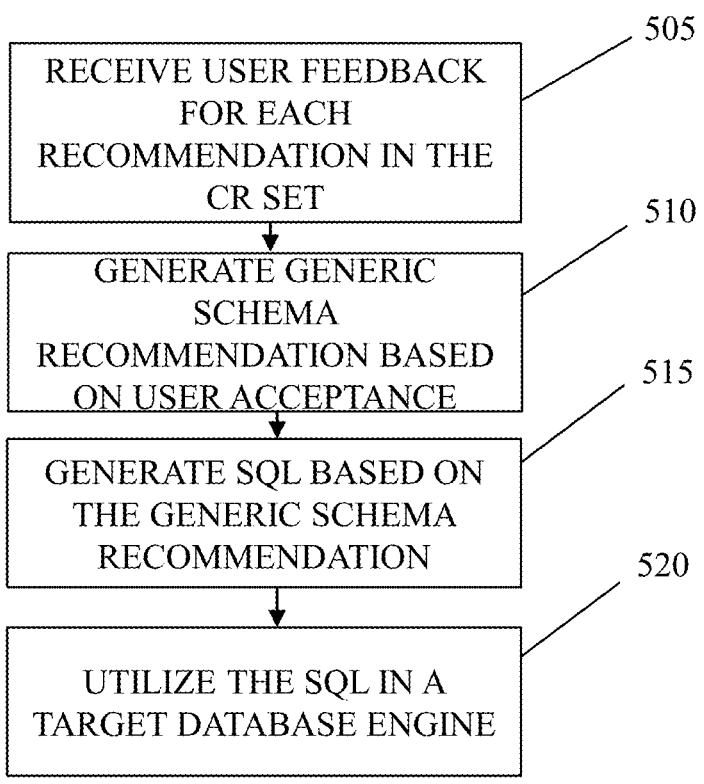
FIG. 6 shows a flowchart of an exemplary method in accordance with aspects of the present invention.

FIG. 6 shows a flowchart of an exemplary method in accordance with aspects of the present invention. Steps of the method may be carried out as operations in the environment 205 of FIG. 2 and are described with reference to elements depicted in FIG. 2.

At step 505, the system receives, at the feedback and evaluation module 216, user feedback. In embodiments and as described with FIG. 2, the user feedback comprises a user acceptance. At step 510, the system generates, at the feedback and evaluation module 216, a generic schema recommendation for the CR set based on the user feedback.

At step 515, the system generates, at the feedback and evaluation module 216, the structured language query (SQL) code based on the generic schema recommendation for the CR set. At step 520, the system utilizes, at the feedback and evaluation module 216, the generated SQL in the target database system.

FIG. 7 shows an example of a visual summary in accordance with aspects of the present invention. FIG. 7 shows the visual summary 700 which is presented (e.g., displayed) to the user. In embodiments, the visual summary 700 includes a plurality of tables (e.g., Table 1, Table 2, Table 3, and Table 4) and the corresponding datatype, patterns/rules associations, functional dependence, and referential integrity for each of the plurality of tables. In particular, the visual summary is color coded based on the ranking score (e.g., high to low). For example, the datatype for Table 1 has a high ranking score while the associations for Table 4 has a low ranking score.

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

analyzing, by a processor set, at least one data source from at least one database to extract characteristics for the at least one data source;

generating, by the processor set, at least one recommendation based on the extracted characteristics for the at least one data source;

performing, by the processor set, conflict resolution on the generated at least one recommendation by removing at least one conflicted recommendation in the at least one recommendation;

determining, by the processor set, a chosen recommendation (CR) set based on the conflict resolution;

ranking, by the processor set, each recommendation in the CR set based on a ranking score; and displaying, by the processor set, a visual summary of each recommendation in the CR set.

2. The computer-implemented method of claim 1, further comprising:

receiving, by the processor set, a modification action; and updating, by the processor set, at least one weight for each recommendation in the CR set based on the modification action.

3. The computer-implemented method of claim 2, further comprising:

re-computing, by the processor set, the CR set based on the updated at least one weight and the modification action; and displaying, by the processor set, each recommendation in the re-computed CR set.

4. The computer-implemented method of claim 1, further comprising:

receiving, by the processor set, an acceptance action; and generating, by the processor set, a generic schema recommendation based on each recommendation in the CR set and the acceptance action.

5. The computer-implemented method of claim 4, further comprising generating, by the processor set, a structured query language (SQL) code based on the generic schema recommendation.

6. The computer-implemented method of claim 5, further comprising utilizing, by the processor set, the SQL in a target database system.

7. The computer-implemented method of claim 1, wherein the at least one data source is selected from the group consisting of database data, query data, log data, domain knowledge data, policy document data, and application source code data.

8. The computer-implemented method of claim 7, further comprising assigning, by the processor set, at least one weight based on the at least one data source.

9. The computer-implemented method of claim 8, wherein the at least one data source comprises a plurality of data sources, and each of the plurality of data sources are assigned a different weight from remaining data sources.

10. The computer-implemented method of claim 1, wherein the performing the conflict resolution comprises performing a greedy approach algorithm by iterating over the generated at least one recommendation.

11. The computer-implemented method of claim 1, wherein the performing the conflict resolution comprises performing an optimized approach algorithm by picking a subset of the generated at least one recommendation.

12. A computer program product comprising:

one or more computer readable storage media; and program instructions stored on the one or more computer readable storage media to perform operations comprising:

analyzing at least one data source from at least one database to extract characteristics for the at least one data source;

generating at least one recommendation based on the extracted characteristics for the at least one data source;

performing conflict resolution on the generated at least one recommendation by removing at least one conflicted recommendation in the at least one recommendation;

determining a chosen recommendation (CR) set based on the conflict resolution;

ranking each recommendation in the CR set based on a ranking score; and displaying a visual summary of each recommendation in the CR set.

13. The computer program product of claim 12, wherein the operations further comprise:

receiving a modification action; and updating at least one weight for each recommendation in the CR set based on the modification action.

14. The computer program product of claim 13, wherein the operations further comprise:

re-computing the CR set based on the updated at least one weight and the modification action; and displaying each recommendation in the re-computed CR set.

15. The computer program product of claim 12, wherein the operations further comprise:

receiving an acceptance action; and generating a generic schema recommendation based on each recommendation in the CR set and the acceptance action.

16. The computer program product of claim 15, wherein the operations further comprise generating a structured query language (SQL) code based on the generic schema recommendation.

17. The computer program product of claim 16, wherein the operations further comprise utilizing the SQL in a target database system.

18. The computer program product of claim 12, wherein the at least one data source is selected from the group consisting of database data, query data, log data, domain knowledge data, policy document data, and application source code data.

19. The computer program product of claim 18, wherein the operations further comprise assigning at least one weight based on the at least one data source.

20. A system comprising:

a processor set;

one or more computer readable storage media; and program instructions stored on the one or more computer readable storage media to cause the processor set to perform operations comprising:

analyzing at least one data source from at least one database to extract characteristics for the at least one data source;

generating at least one recommendation based on the extracted characteristics for the at least one data source;

performing conflict resolution on the generated at least one recommendation by removing at least one conflicted recommendation in the at least one recommendation;

determining a chosen recommendation (CR) set based on the conflict resolution;

ranking each recommendation in the CR set based on a ranking score;

displaying a visual summary of each recommendation in the CR set; and generating a structured query language (SQL) based on an approval of the displayed visual summary.

*    *    *    *    *